United States Patent
Mitchell et al.

(10) Patent No.: US 7,543,032 B2
(45) Date of Patent: Jun. 2, 2009

(54) METHOD AND APPARATUS FOR ASSOCIATING MESSAGES WITH DATA ELEMENTS

(75) Inventors: David C. Mitchell, Orem, UT (US); Dale K. Mitchell, Orem, UT (US); Bruce P. Mitchell, Orem, UT (US); Scott E. Hamilton, Orem, UT (US)

(73) Assignee: Canyonbridge, Inc., Orem, UT (US)

( * ) Notice: Subject to any disclaimer, the term of this patent is extended or adjusted under 35 U.S.C. 154(b) by 48 days.

(21) Appl. No.: 11/255,309

(22) Filed: Oct. 19, 2005

(65) Prior Publication Data

US 2006/0088144 A1    Apr. 27, 2006

Related U.S. Application Data

(60) Provisional application No. 60/621,419, filed on Oct. 22, 2004.

(51) Int. Cl.
G06F 15/16    (2006.01)
(52) U.S. Cl. .............. 709/206; 707/10; 379/88.14; 379/88.17
(58) Field of Classification Search .......... 379/88.17, 379/88.22, 88.25, 88.13; 309/206; 707/10; 709/206
See application file for complete search history.

(56) References Cited

U.S. PATENT DOCUMENTS

| | | | | |
|---|---|---|---|---|
| 5,448,740 A | 9/1995 | Kiri et al. | ............ | 717/155 |
| 5,796,394 A * | 8/1998 | Wicks et al. | ............ | 715/751 |
| 5,864,862 A | 1/1999 | Kriens et al. | ............ | 707/103 R |
| 5,872,973 A | 2/1999 | Mitchell et al. | ............ | 395/685 |
| 5,978,834 A | 11/1999 | Simonoff et al. | ............ | 709/203 |
| 6,005,568 A | 12/1999 | Simonoff et al. | ............ | 715/744 |
| 6,043,815 A | 3/2000 | Simonoff et al. | ............ | 715/744 |
| 6,049,673 A | 4/2000 | McComb et al. | ............ | 717/164 |
| 6,061,797 A | 5/2000 | Jade et al. | ............ | 713/201 |
| 6,085,231 A * | 7/2000 | Agraharam et al. | ............ | 709/206 |
| 6,145,120 A | 11/2000 | Highland | ............ | 717/106 |
| 6,169,992 B1 | 1/2001 | Beall et al. | ............ | 707/103 |
| 6,182,277 B1 | 1/2001 | DeGroot et al. | ............ | 717/115 |

(Continued)

FOREIGN PATENT DOCUMENTS

EP    1 081 918 A2    3/2001

OTHER PUBLICATIONS

International Search Report for Patent Application No. PCT/US2005/08646, dated Jan. 24, 2006 (1 page).

(Continued)

*Primary Examiner*—Simon Sing
(74) *Attorney, Agent, or Firm*—Goodwin Procter LLP

(57) ABSTRACT

A method and apparatus for associating message types, elements, and/or content with data from one or more data stores are provided. Current limitations on the tracking and management of information contained within or associated with message types and elements are overcome through an association manager or "data linking engine" that provides context-driven workflow management for end-users. The end-users may work in an application context that is not integrated in the messaging system. The application context may include databases, systems, data stores, links in Web pages, etc. If the association manager appends data to a given message, recipients of that message have the ability to access added functionality within the context of the messaging system.

50 Claims, 7 Drawing Sheets

U.S. PATENT DOCUMENTS

| | | | |
|---|---|---|---|
| 6,252,588 B1 * | 6/2001 | Dawson | 715/752 |
| 6,275,848 B1 * | 8/2001 | Arnold | 709/206 |
| 6,292,933 B1 | 9/2001 | Bahrs et al. | 717/107 |
| 6,304,636 B1 * | 10/2001 | Goldberg et al. | 379/88.14 |
| 6,331,855 B1 | 12/2001 | Schauser | |
| 6,356,933 B2 | 3/2002 | Mitchell et al. | 709/203 |
| 6,370,681 B1 | 4/2002 | Dellarocas et al. | 717/110 |
| 6,377,973 B2 | 4/2002 | Gideon et al. | 709/203 |
| 6,424,948 B1 | 7/2002 | Dong et al. | |
| 6,434,598 B1 | 8/2002 | Gish | 709/203 |
| 6,640,249 B1 | 10/2003 | Bowman-Amuah | |
| 6,654,784 B1 | 11/2003 | Wei | 709/203 |
| 6,654,932 B1 | 11/2003 | Bahrs et al. | 715/507 |
| 6,675,228 B1 | 1/2004 | Bahrs et al. | 719/318 |
| 6,687,745 B1 | 2/2004 | Franco et al. | 709/219 |
| 6,748,570 B1 | 6/2004 | Bahrs et al. | 715/526 |
| 6,766,333 B1 | 7/2004 | Wu et al. | 707/201 |
| 6,779,021 B1 * | 8/2004 | Bates et al. | 709/206 |
| 6,779,155 B1 | 8/2004 | Bahrs et al. | 715/526 |
| 6,779,177 B1 | 8/2004 | Bahrs et al. | |
| 6,782,508 B1 | 8/2004 | Bahrs et al. | 715/526 |
| 6,795,851 B1 | 9/2004 | Noy | |
| 6,806,825 B2 | 10/2004 | Andrusiak et al. | 342/185 |
| 6,829,771 B1 | 12/2004 | Bahrs et al. | 719/318 |
| 6,836,885 B1 | 12/2004 | Buswell et al. | |
| 6,847,987 B2 | 1/2005 | Case et al. | |
| 6,862,711 B1 | 3/2005 | Bahrs et al. | 715/526 |
| 6,880,126 B1 | 4/2005 | Bahrs et al. | |
| 6,886,046 B2 | 4/2005 | Stutz et al. | 709/246 |
| 6,886,169 B2 | 4/2005 | Wei | 719/316 |
| 6,886,170 B1 | 4/2005 | Bahrs et al. | 719/318 |
| 6,888,927 B1 * | 5/2005 | Cruickshank et al. | 379/88.11 |
| 6,897,833 B1 | 5/2005 | Robinson et al. | |
| 6,901,554 B1 | 5/2005 | Bahrs et al. | 715/526 |
| 6,901,595 B2 | 5/2005 | Mukundan et al. | 719/316 |
| 6,920,480 B2 | 7/2005 | Mitchell et al. | 709/203 |
| 6,925,631 B2 | 8/2005 | Golden | 717/115 |
| 7,089,287 B2 * | 8/2006 | Bellotti et al. | 709/206 |
| 2001/0047406 A1 | 11/2001 | Araujo et al. | 709/223 |
| 2003/0046587 A1 | 3/2003 | Bheemarasetti et al. | 726/4 |
| 2003/0182363 A1 | 9/2003 | Clough et al. | 709/203 |
| 2003/0182469 A1 | 9/2003 | Lok et al. | 719/328 |
| 2003/0191799 A1 | 10/2003 | Araujo et al. | 709/203 |
| 2003/0229672 A1 * | 12/2003 | Kohn | 709/207 |
| 2004/0021679 A1 | 2/2004 | Chapman et al. | 715/700 |
| 2004/0088409 A1 | 5/2004 | Braemer et al. | 709/225 |
| 2005/0086608 A1 | 4/2005 | Roessler | 715/764 |
| 2005/0251551 A1 | 11/2005 | Mitchell et al. | 709/203 |

OTHER PUBLICATIONS

International Preliminary Report on Patentability for International application No. PCT/US2005/037701 dated Apr. 24, 2007 (1 page).

Written Opinion of the International Searching Authority for International application No. PCT/US05/37701 dated Dec. 14, 2006 (6 pages).

International Search Report for International application No. PCT/US05/37701 dated Dec. 14, 2006 (2 pages).

* cited by examiner

METHOD AND APPARATUS FOR ASSOCIATING MESSAGES WITH DATA ELEMENTS

CROSS-REFERENCE TO RELATED APPLICATIONS

This application claims the benefit of priority from U.S. Provisional Application Ser. No. 60/621,419, filed Oct. 22, 2004, the specification and figures of which are herein incorporated by reference.

BACKGROUND

1. Field of the Invention

This invention relates to the field of electronic communication. More specifically, the invention relates to associating electronic messages with elements of data.

2. Background Art

With the advent of the Internet and the increased ease of communications and access to data, systems, and applications not locally stored or run, interoperability between disparate systems and applications has become a key goal for corporate entities. Application integration is being attempted in various guises, all with the intent of increasing productivity and easing work flow, thus reducing the overall costs of doing business.

The most widely used sets of applications on the Internet are those that facilitate communication, with e-mail, chat, and instant messaging being examples that readily come to mind. Increasingly however, other messaging formats such as video and voice communications are moving to Internet hardware, software, and communication protocols for their standard delivery systems. As the present inventors have identified, messaging systems are among those that may provide the greatest benefits by being integrated with other applications.

Traditional Approaches to Messaging Integration

Currently, little has been done to integrate messaging systems with other functionality and data in meaningful ways. Most messaging integrations today exist as one-to-one plug-in functionality created for specific messaging paradigms, such as those created for integration with Microsoft Outlook™. While these integrations are useful in their limited arenas, they lack a critical feature; none of them solve the problem of context driven work flow management.

Traditional Approaches to Context Driven Work Flow Management

The term "work flow" is used to represent the order in which activities associated with a project are completed. Traditionally, work flow has been linked to the content of individual messages through human agents. What is missing from prior art messaging systems is the ability to describe the relationship of an incoming message to previously existing data stored in a data system or context external to the messaging system itself.

For example, suppose a salesperson is using a Customer Relationship Management (CRM) software package to track workflow, and via a separate e-mail application, the salesperson receives an e-mail expressing interest in the product the salesperson is selling. Current messaging solutions do not have the capability to derive data from the e-mail and compare it with the data located in the CRM system to alert the salesperson that this particular e-mail has been sent by a repeat customer wishing to place a large order. Perhaps the customer desires a rush job, but because the e-mail is not distinguished in any meaningful way from any of the other many, many e-mails the salesperson may encounter in a given day, the salesperson may not give the e-mail the attention it deserves. A sale may be lost or the entire business generated by that customer may be given to another company, because there is no automated way in the prior art to associate the content of the message with the work flow data stored in the CRM system.

SUMMARY OF THE INVENTION

The present invention is a method and apparatus for associating messages with data elements. One or more embodiments of the present invention provide a method for associating message types, message elements and/or message content with data elements from data sources external and/or internal to the messaging system. The data so associated may be used, for example, to provide end users with sensory (e.g., visual or aural) cues to add context to a given message when it is received.

In one or more embodiments, the system may analyze incoming messages to determine a number of properties and attributes to link and/or associate each message with a set of pre-established properties and attributes. The messaging system may generate a set of descriptives that allow a user to view the message content and all of the associations that the system generates.

One or more embodiments of the present invention may also provide for delivering context or association data with the message. For example, one or more embodiments may provide the ability to append an association data package to the message. The appended association data may be used, for example, to enable a system to track the history of a message, as well as determine the manner in which the system makes a message available (e.g., to a set of authorized users). In one or more embodiments of the invention, the data appended to the message may comprise, for instance, a link to an activity history record stored locally or remotely. The data associated with a message may be included in the message itself and/or stored elsewhere (e.g., a database accessible to both the system and users), and may persist for the life of the message as the message is forwarded, replied to, etc.

Embodiments of the invention may provide an apparatus for end-users to create custom cues to the context of a given message type, or of messages received from individual senders. Users may also use the structure of messaging rules, when provided by messaging systems, to extend data associated with various message types, elements, and/or content. Selecting a visual cue may provide a user with access to another, possibly remote, application that allows the user to extend the data information, or to append new data elements to the message type, element, or content. Where such a messaging system is not available to end users, the apparatus embodying the invention (e.g., an association manager) may provide default association extension functionality to the end user.

DETAILED DESCRIPTION OF THE INVENTION

Figure 1:
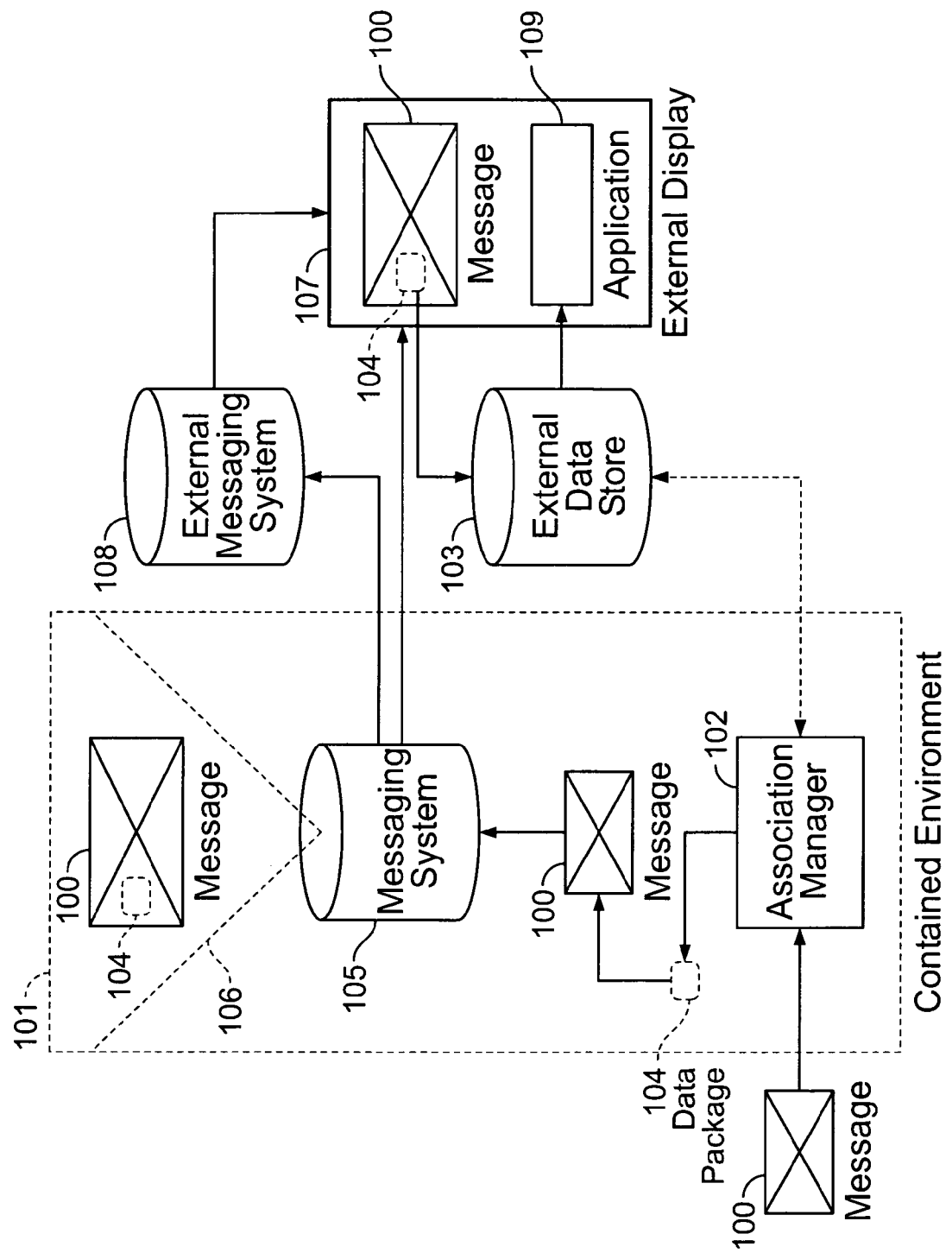
FIG. 1 is a block diagram illustrating the path of a message as it undergoes the association process and is presented to an end-user along with associated data elements, in accordance with an embodiment of the invention.

A method and apparatus for associating messages with data elements are described. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Terminology

Throughout the following disclosure, references to a "user" may refer to a person using a computer application and/or to one or more software processes. A software process may be any computer program, executing locally or remotely, that communicates with embodiments of the invention. Processes may be event-triggered upon the occurrence of an action (e.g., establishing a network connection or opening a file). Examples of a user may include a person accessing a computer system, a script program or any other computer program.

Embodiments of the invention described herein are set forth in terms of methods and systems implementing those methods. One or more embodiments of the invention may be implemented as computer software, i.e., computer program code capable of being stored in the memory of a digital computer and executed on a microprocessor, or as hardware, i.e., a circuit board-based implementation (e.g., microprocessors, RAM memory, and field-programmable gate array (FPGA) based electronic components), or some combination of software and hardware.

Throughout this specification, references to a "user interface" may refer to any type of electronic system capable of receiving and transmitting data, either over a wire or wirelessly. These systems may include, for example, computers having computer displays, mobile phones, portable devices and the applications executing on those systems. The applications may include, for example, computer operating systems, Internet browsers, graphics rendering applications, voice communication applications, and any application capable of presenting data to a user and/or receiving input from the user.

References to a "server" may refer to the machine hardware acting as the server or to a computer program running on that machine (or a cluster thereof) to provide a service. References to a "machine" may refer to a physical hardware system or to a virtual machine, such as a JAVA Virtual Machine (JVM), or even to multiple virtual machines running multiple Operating Systems on the same hardware where they can share computing resources.

In the description below, a reference to a "data source" may refer to any hardware and/or software apparatus from which a computer may obtain data, e.g., using one or more protocols. In its simplest form, a data source may be embodied as a flat file residing in a file system. A data source may also be embodied as a database, an electronic mail server, a Lightweight Directory Access Protocol (LDAP) based server, or any other apparatus capable of serving data.

In one or more embodiments, the invention may be implemented as a computer program based on a modularized architecture. Each modular component may be implemented as part of a larger infrastructure (e.g. within an Application Server) or as a plug-in or applet that may be embedded within, or interfaced with third party applications. The modularized functionality described in the following description is presented for purposes of example, and to simplify understanding of the method and apparatus of the invention. Embodiments of the invention may also be implemented in a system without distinct modular boundaries, or as modules with different boundaries (i.e., different functional groupings) than those specifically described herein.

System and Method Overview

In one or more embodiments of the invention, message data (e.g., from e-mail, electronic chat messages, instant messaging services, voicemail, etc.) is analyzed to generate association data that presentation tools (e.g., viewing tools) may use to link messages with other pertinent information via sensory cues. The system may associate messages with stored data automatically, or the association process may be triggered, e.g., following a request from a user. The system may also generate actions in response to user input.

Though the sensory cues mentioned above may most commonly be implemented as visual and/or audible cues, such sensory cues may be implemented using any human interfacing technology (e.g., Braille presentation apparatus, force feedback, etc.) directed to any human sensory perception. The sensory cues may also be implemented with electronic or computer-readable cues that a third party application or device may sense and act upon (e.g., data symbols or flags detectable by a computer process or application, or an electrical impulse or state change that an electronic device may detect).

Messages may be obtained from multiple sources (e.g., text-based electronic media and any other electronic communication means). By determining message type attributes, and analyzing the message content or accompanying metadata (e.g., email headers, telephone destination number, caller identification or any other identifying information), the system may determine which data sources to access in order to fetch pertinent information. The system may then generate association data that may be added to the message or stored in a data repository (e.g., a database) accessible to end-users for viewing and interaction.

Figure 6:
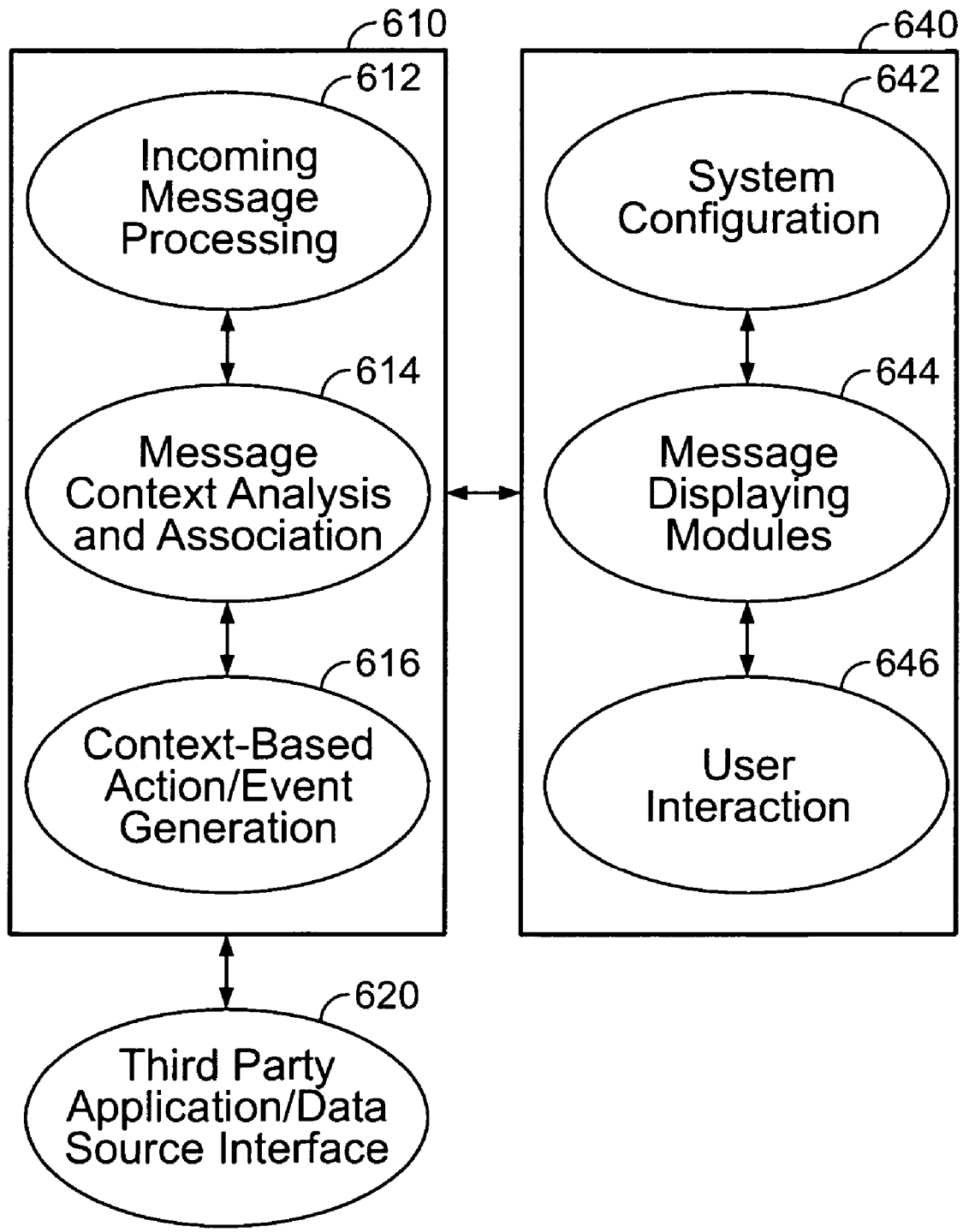
FIG. 6 is a block diagram illustrating system modules utilized for processing data in accordance with an embodiment of the invention.

FIG. 6 is a block diagram illustrating system modules utilized for processing data in accordance with an embodiment of the invention. The set of system modules 610 may be implemented as one or more processes that run, for example, on a server computer and provide processing tasks or services. Modules 612 allow the system to process incoming messages and retrieve content data and/or metadata.

Modules 614 represent one or more processes for analyzing the context of a message. For example, the body of an email may refer to an invoice number, which would indicate that the email is related to a commercial transaction. In another example, a voice mail may be received along with metadata that allows the system to associate a telephone number with a person whose information is stored in an address book. Modules 614 may utilize the context data items to determine which data stores may contain data related to the message in question.

Modules 620 allow a system to interface with data stores to retrieve data. For example, data may be stored in a relational database. In one embodiment, modules 620 may allow the system to connect, for example, through an Open Database Connectivity (ODBC) interface to access the information. Modules 620 may include, for example, Enterprise JAVA beans (EJB) provided by third party application vendors in order to access specific information, and/or interfaces to web services for remotely accessing data stored (and maintained) by a third party.

In connection with the message content analysis, the system may utilize modules 616 to generate actions based on the context and/or user input (or preferences).

A system embodying the invention may comprise a set of modules 640 that allow for user interaction with the system. The set of user modules 640 may include, for example, tools that enable a user to interact locally with the system (e.g., through a graphical user interface) or remotely (e.g. through a web browser).

Modules 642 may provide an interface and tools for a user (e.g., an administrator) to input configuration data. Examples of configuration data may include simple instructions such as entering the location of data sources, and more complex tasks such as entering levels of importance based on keywords in messages or the message type. The configuration modules 642 allow a system embodying the invention to handle any existing messaging system or future messaging means.

Modules 644 utilize the association data to provide sensory cues (e.g., clickable icons) to facilitate further user action on a given message. Modules 644 may be implemented, for example, as a plug-in to applications from third party vendors. Modules 646 may interface with a server (e.g., with modules 616) to trigger actions based on user input.

Figure 7:
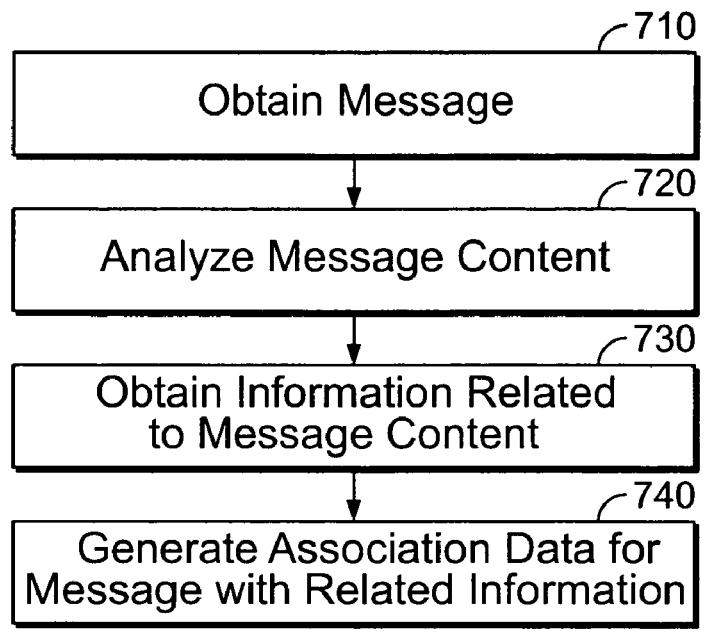
FIG. 7 is a flow diagram of a process for associating messages with data from multiple sources based on message context, in accordance with an embodiment of the invention.

FIG. 7 is a flow diagram illustrating a process for associating messages with data from one or more sources, based on message context, in accordance with one or more embodiments of the invention. At step 710, a system embodying the invention may obtain a message. Obtaining a message may mean receiving the entire message or a set of descriptive data. For example, the system may receive a recorded voice message or the telephone number from which a call is initiated. The system may obtain the message in response to a request from a user accessing the message.

At step 720, the system may analyze the incoming message's content and determine a set of descriptives (e.g., metadata regarding significant characteristics of the message, such as message source, other parties included in the message, time information, message type, etc.). The descriptives may then be used by the system to identify which data sources may contain data related to the message. At step 730, the system obtains data from one or more data sources. Obtaining the data may require accessing both local and remote sites to retrieve data. Furthermore, retrieving data may require interfacing with one or more data sources and/or applications. For example, the system may interface with a customer relationship management application to retrieve transaction history associated with a client.

At step 740, the system generates association data. Association data may serve many purposes. For example, when a user is viewing messages, the viewing environment may use the association data to present visual cues in connection with specific information associated with a message. In one or more embodiments, association information may provide the viewing tools with the location (e.g., a hyper-link) of data pertinent to a message. Association data may also provide a link to other applications, to trigger a response action following user input or a trigger from an automatic process.

Figure 8:
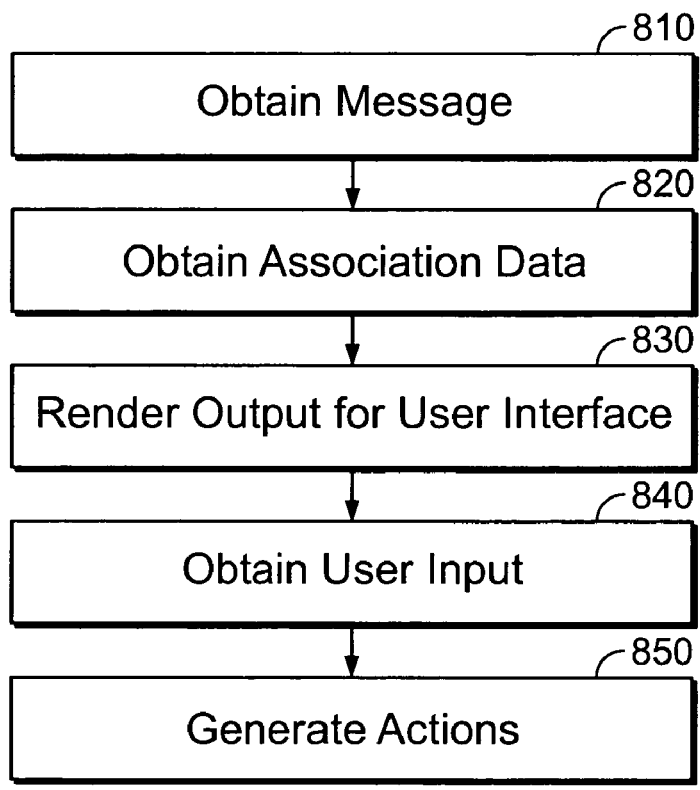
FIG. 8 is a flow diagram of a process for viewing association data and for allowing user interaction, in accordance with an embodiment of the invention.

FIG. 8 is a flow diagram illustrating a process for viewing association data and allowing user interaction in accordance with an embodiment of the invention. At step 810, a system embodying the invention obtains a message for viewing in a client application, for example. Obtaining a message may require accessing one or more message sources. At step 820, the system obtains the association data. Obtaining association data may require accessing stored association data and/or parsing the message for association data stored in a data package along with the message. Obtaining the association data may also be triggered following a user's access of the message or issuance of a specific request to conduct such a task.

At step 830, in connection with rendering message data for presentation to a user, the system generates sensory aids, such as iconic representations, hyperlinks, buttons and any other sensory cues that make the user (or another process) aware of message association features. Rendering message data involves analyzing the data and applying further management rules. The rendering process may check, for example, for time elapsed since a message was received, and attribute an adequate importance level to the message. The rendering step may also involve communicating with the system to check whether the system needs to update the association data.

At step 840, a system embodying the invention obtains user input. As mentioned above, the system may provide multiple interface modules that allow a user to interact with the system. For example, a user may click a button to execute a pre-set action made available by the system as a result of the context analysis and the determination of potential user response actions. To illustrate, a user viewing an email message may wish to dial the number of the person who originated the email. In this case, when the system determines that the telephone data of the sender is available, the system may present a call button on the interface. When the user clicks the button, the system initiates a telephone call using the sender's stored telephone information.

At step 850, the system generates the action in accordance with user's input (e.g., by dialing the sender's telephone number in response to the clicked button).

Association Manager

Embodiments of the present invention may include an Association Manager process or "data assignment engine". The Association Manager recognizes message types from various messaging systems or paradigms. The Association Manager may be implemented within a specific messaging system or paradigm to inspect various message types associated with that system or paradigm. For example, in the case of an e-mail system, the association manager may inspect appointment data, task data, note data, journal entries and any other types of data in addition to email messages. The association manager may associate email message content with data stored locally or remotely.

A system implementing the invention may handle a variety of messages from different sources. An extended, though not exhaustive, list of messaging types may include the following:

Text messages: defined as any text-based message transmitted through any communication means (e.g. cellular phone, personal digital assistant or other communication system).

Instant messages: defined as any message relayed through a (network of) computer(s) that a plurality of users may utilize to exchange messages instantly.

Chat messages: similar to instant messaging with the ability to broadcast a system's incoming messages to all users connected to a virtual entity defined as a chatroom.

Multimedia and Voice messages: defined as any message containing audio and/or video data, such as a telephone message recorded by a user or a computer-generated message.

Incoming Telephone calls

Electronic mail

Tasks: defined as data entered in an electronic task scheduling application.

Appointments: data similar to task data, defined as further having time lines.

Other calendar items

Contacts: for example, data from an address book.

Notes

Journals

Virtual memos

In embodiments of the invention, an Association Manager may inspect a message type as it is received, then query a specific external data store for data pertinent to that message, whether in type, element, or content. A message type may refer, for example, to the type of data contained in the message and/or the electronic media used for transmitting the message. To illustrate, an email message may contain, in addition to text, a recorded voice mail message or a hyper-link to the content of a video message stored in a remote location on the Internet. The Association Manager determines a set of attributes that allow it to determine data sources that may contain data pertinent to the content of a message, and then queries those data sources to retrieve the data.

A queried data store may grant access rights to the Association Manager (often in association with an integrated application) for data queries and data extraction and assignment. Typically, the data store may exist on a system external to that hosting the Association Manager, as well as that hosting the message system with which the Association Manager interacts. The Association Manager may commonly be hosted in the same physical or logical environment hosting the message system, though this is not a requirement.

The term "data store" may refer to a database or to a "data system," which, among other items, may include databases, data values in a running application, data gleaned from web pages, etc. Examples of data stores that may be accessed by an Association Manager may include the following:

Customer Relationship Management (CRM) systems

Enterprise Resource Planning (ERP) systems

E-mail Global Address List (GAL) in external messaging systems

Proprietary database systems

Proprietary applications

Advertising links

Message Association

FIG. 1 is a block diagram illustrating the path that a message may take as it undergoes the association process and is presented to an end-user along with the associated data elements, in accordance with an embodiment of the invention. In the example of FIG. 1, Message 100 is sent to a system 101. System 101 may be a physically contained environment, such as a server (or cluster thereof), or logically distributed as a multi-location wide area network.

A message may be received first by the Association Manager 102. Association Manager 102 inspects the message type, message elements, and/or contents of Message 100, and then communicates with one or more data sources to retrieve pertinent data from the Data Store (e.g., 103). Alternatively, the association manager may retrieve data from optimally located caching data stores. Association Manager 102 may then create a data package 104, comprising association data or metadata, which the Association Manager 102 attaches to Message 100.

As one example, data package 104 may include two properties referred to herein as Name (e.g., a message type specifier or data source identifier) and Value (e.g., a set of data describing or supporting the association, a reference to an external application data source, metadata about the other contents of the package, etc.). Other embodiments of the invention are not restricted to implementing only one or two properties in package 104, and may or may not include Name and/or Value in package 104.

Messages in many messaging systems have extensible formats; likewise, many messaging systems have extensible property lists, in which case the messaging database itself could contain the information. On the other hand, the data associating the message and the application context may be stored in a yet another data store external to either system.

Message 100 enters the Messaging System 105. Expanded View 106 shows Message 100, with data package 104 attached, which may be stored within Messaging System 105. Messaging System 105 may (or may not) relay Message 100 on to an External Messaging System 108. When a user uses External Display 107 to view Message 100 with attached data package 104, the user may view Message 100 either on Messaging System 105 or on External Messaging System 108, depending on Message 100's final destination. Likewise, the message may be transferred to the External Display 107 device itself.

If data package 104 is presented as a linked visual element, and the user chooses to select the link, data package 104 may link back to External Data Store 103. Selection of the link causes Application 109 to be displayed to the user on External Display 107, so that the user may more efficiently proceed with a work flow task that may now be more efficiently driven by the context of Message 100 and data package 104.

Message Properties Generation and Usage

In the example of FIG. 1, data package 104 may include two properties called "Name" and "Value". In one embodiment of the invention, "Name" may refer to a data element ID or a type specifier (e.g., a property referred to herein as a Data Source Identifier (DSID) that provides the information linking the data contained in the other property to the originating data source).

"Value" may refer to an external application data source ID, or may contain a more complex set of data, such as an entire Extended Markup Language (XML) application description document. In the latter case, clicking a visual representation of a link to "Value" may result in launching an application associated with the XML document. "Value" may also be utilized to present information to the viewer as an XML manifest that describes, for example, the linkage to an external application or data source item. "Value" may contain information about the information stored in data package 104. The information may, for example, inform the user whether the information in data package 104 has ever been accessed previously, and if so, by whom. In other cases, "Value" may function as a read/unread marker that can be presented to the user in a perceptible manner (e.g., visually, aurally, etc.).

Because of the capability provided by "Value", and the sensitivity of some of the data the value property may contain, as well as the fact that Name and Value may be preserved for the life of the message (which could be years if the message is archived), Value may provide controlled access to content based on roles and responsibilities. For example, name/password authentication may be required, particularly if Value references information stored elsewhere.

A Graphical User Interface Example

Figure 2:
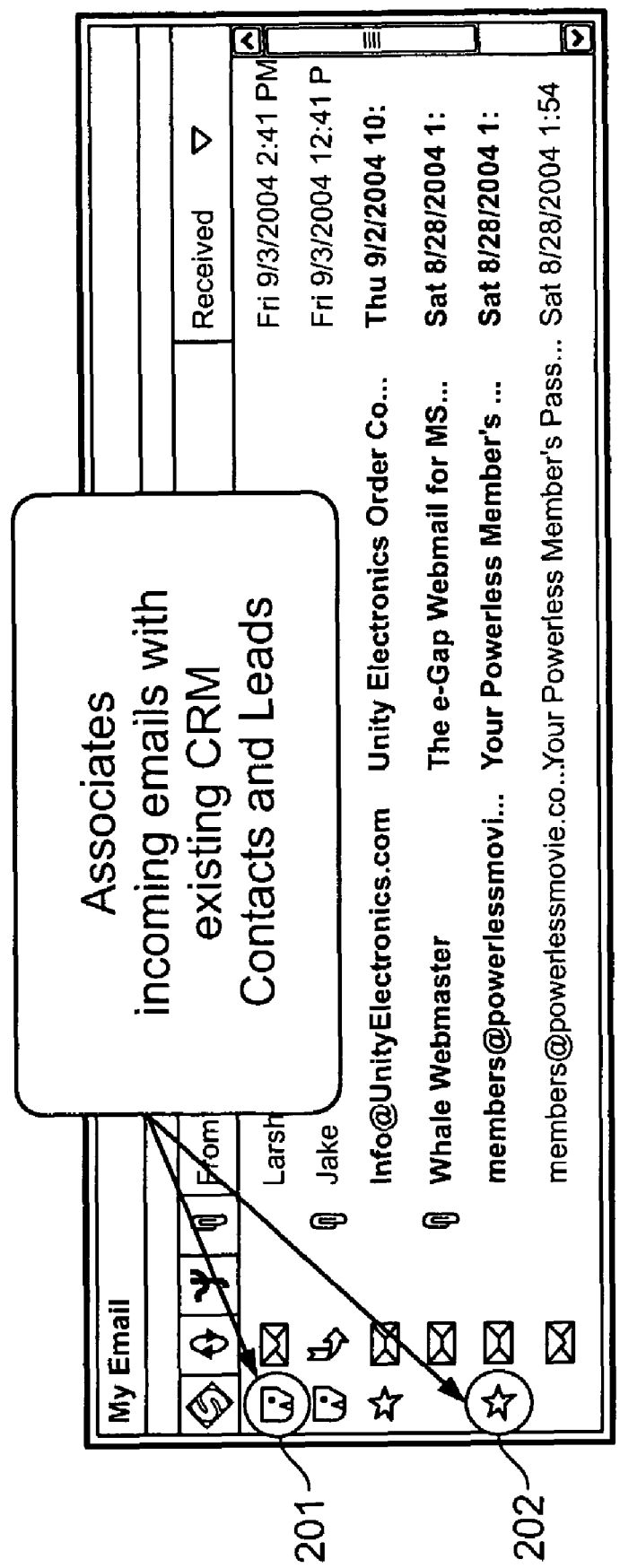
FIG. 2 shows an example graphical user interface display that may be used to show visual cues for context driven workflow management, in accordance with an embodiment of the invention.

FIG. 2 shows an example graphical user interface display used to present visual cues for context driven workflow management, in accordance with an embodiment of the invention. In the example of FIG. 2, the display shows an interface of an integrated web application where associated data is presented to the user through a visual medium as icons. This is possible because the application interface is extended to display the information in a new column. Messaging systems in general are extensible, and if the system is extended to provide cues to the users, the data associated with the message becomes useful. Alternatively, access to the data could be provided through the creation of an attachment to the e-mail that may comprise, for example, HTML data displaying links to another system.

If desired, the icons 201 and 202 displayed in FIG. 2 may be clickable links that launch applications containing the data that provides context for an incoming e-mail. Likewise, clicking an icon may cause functionality located in Value to extract contact information from the message properties and send that information, for example, to the data store of a CRM application, where the data is stored as a new lead and presented visually to the user for immediate usage.

Likewise, clicking an icon may access a reference to the originating database to update appropriate activity records the e-mail represents. For example, suppose a user has obtained contact information at a trade show, and then stored that information as a lead in a CRM database. If the contact sends the user an e-mail, the Association Manager can determine that the incoming e-mail is associated with a lead in the CRM database. The Association Manager may present that information to the user graphically, e.g., as an icon. If the user then clicks the icon, functionality contained in Value may present the user with the interface for the CRM application. Clicking the icon may also dial the contact automatically.

Telephone Messaging Example

Among the many messaging means for which the invention may provide a context driven workflow, one or more embodiments may be implemented to process telephone messages. An incoming call may be linked to a phone number in an external database, thus when the Caller ID is available, the system may access and display additional information to the user simultaneously with the telephone call.

The added value of such functionality is significant in a business environment, for example, since a person receiving a call can easily identify the person initiating the call, and automatically access any other data related to the caller (e.g., previously conducted business, or business transaction in progress). The person receiving the call is thus able to adequately greet the caller and quickly provide answers to the caller's questions (e.g., in the case when a customer is requesting an update about a commercial transaction).

With the functionality provided by the Association Manager, systems can be set up so that workflow tracking software may launch on receipt of the phone call and display data pertinent to the caller, before the user has picked up the phone.

Association of Outgoing Messages

Figure 3:
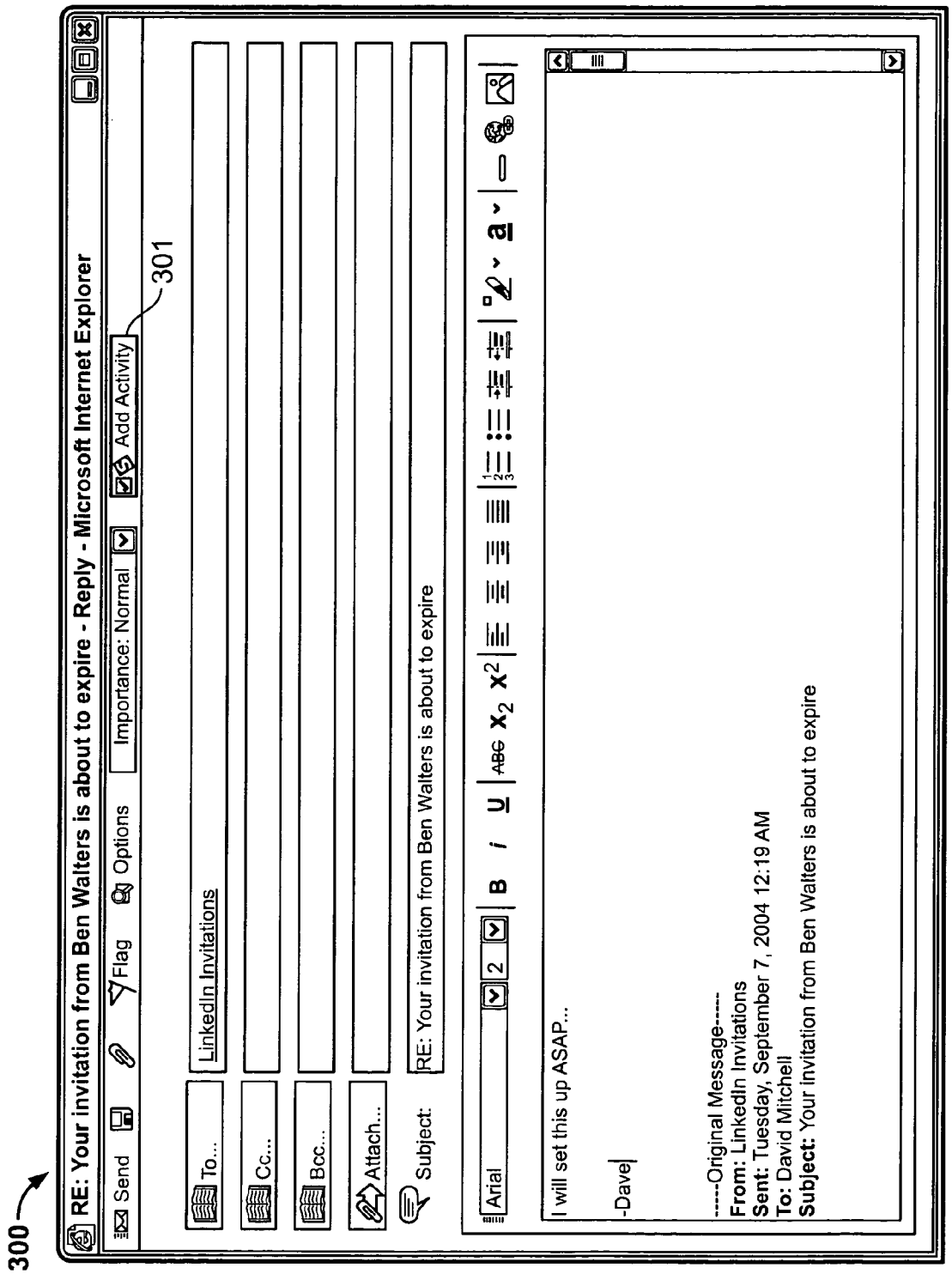
FIG. 3 shows a screenshot of an application interface implementing an embodiment of the invention.

The Association Manager may also be used to associate outgoing messages with external data elements. FIG. 3 provides an example of this functionality in accordance with an embodiment of the invention. In FIG. 3, Reply E-mail 300 is a screenshot of an e-mail in an e-mail messaging system using an Association Manager. Add Activity Check Box 301 represents a property appended to the list of properties associated with mail messages in an Exchange mail server. Because the property list has been extended, this example embodiment of the invention may be used to provide automated workflow management for a CRM application and data store external to the messaging system.

An interface created for an integrated e-mail/CRM application suite may present this property visually through a checkbox and associated icon and text. For example, the icon and text may notify the user that, with the box checked, an e-mail sent as a reply to a lead in the CRM application suite is associated with a history listing all activity for that lead. Any incoming e-mail from that lead may also be flagged by the Association Manager as belonging to that account.

Figure 4:
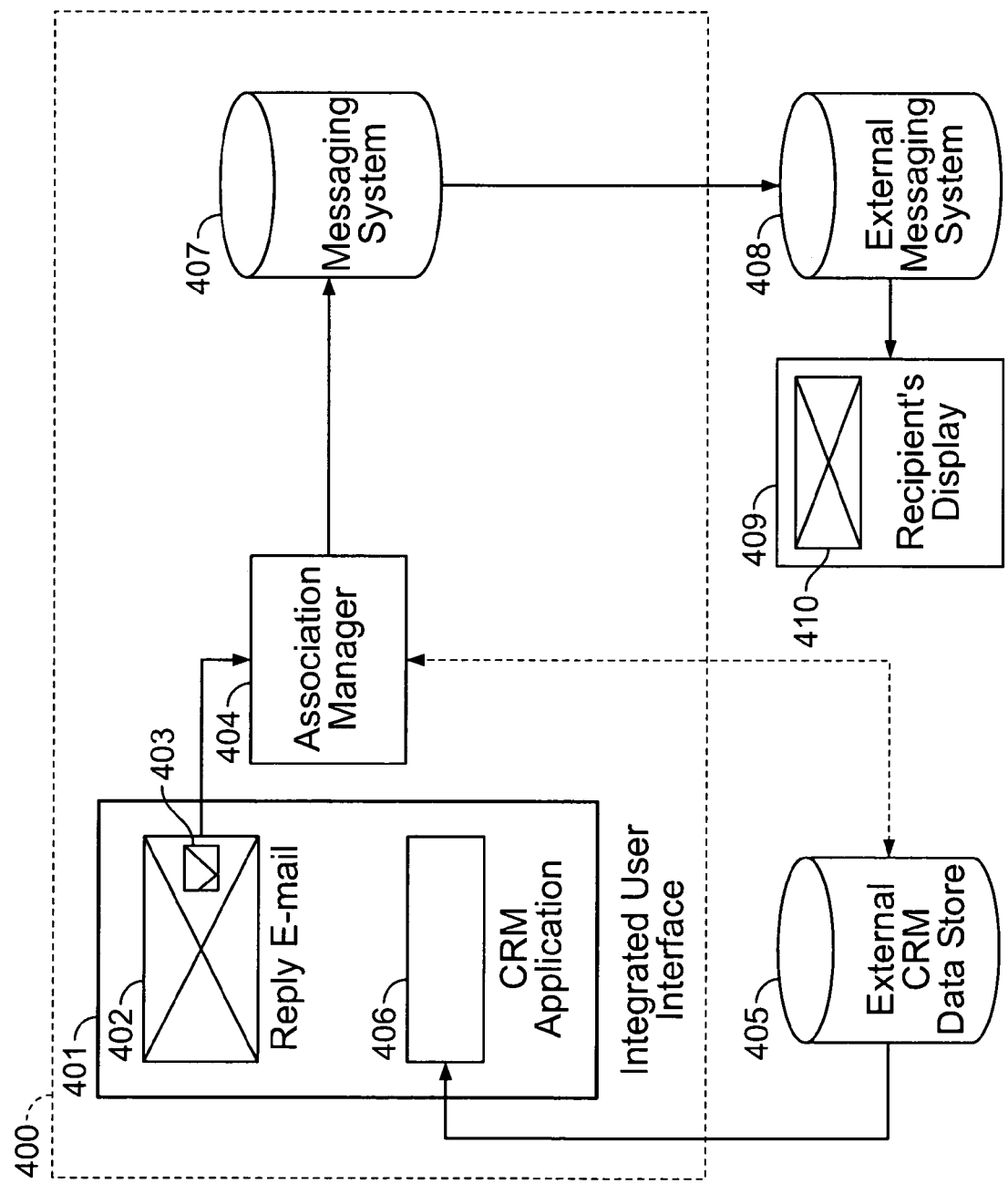
FIG. 4 is a block diagram illustrating message flow and association for the example of FIG. 3, in accordance with one or more embodiments of the invention.

FIG. 4 is a block diagram of message flow and association of data elements for an e-mail as shown in FIG. 3, in accordance with one or more embodiments of the invention. In FIG. 4, Contained Environment 400 is the environment in which the association takes place. Integrated User Interface 401 represents an integrated application interface in which both e-mail and CRM data are displayed and accessible. Reply E-mail 402 represents an e-mail sent in reply to some communication from a lead in the CRM data source. Added Property checkbox 403 represents a property that by default flags the e-mail as part of an activity history for a particular lead in the CRM portion of the integrated application.

In this example, when Reply E-mail 402 is sent, Association Manager 404 inspects the e-mail before the associated messaging system receives the e-mail. Association Manager 404 detects the property setting on the e-mail and communicates a data change to External CRM Data Store 405, which then updates the CRM Application 406 portion of Integrated User Interface 406 as needed. Message 402 continues past Association Manager 404 into Messaging System 407 where Message 402 is routed to the appropriate External Messaging System 408. The External Messaging System 408 presents message 402 on the Recipient's Display 409 as displayed message 410. Added property 403 may or may not be visible in Recipient's Display 409, depending on whether this particular interface provides this capability.

The foregoing serves only as an example of an embodiment of the invention. In other embodiments, for example, Association Manager 404 may alternatively be positioned after Messaging System 407 in FIG. 4 and still supply the same association capability.

Example of Multiple Configurations

Figure 5:
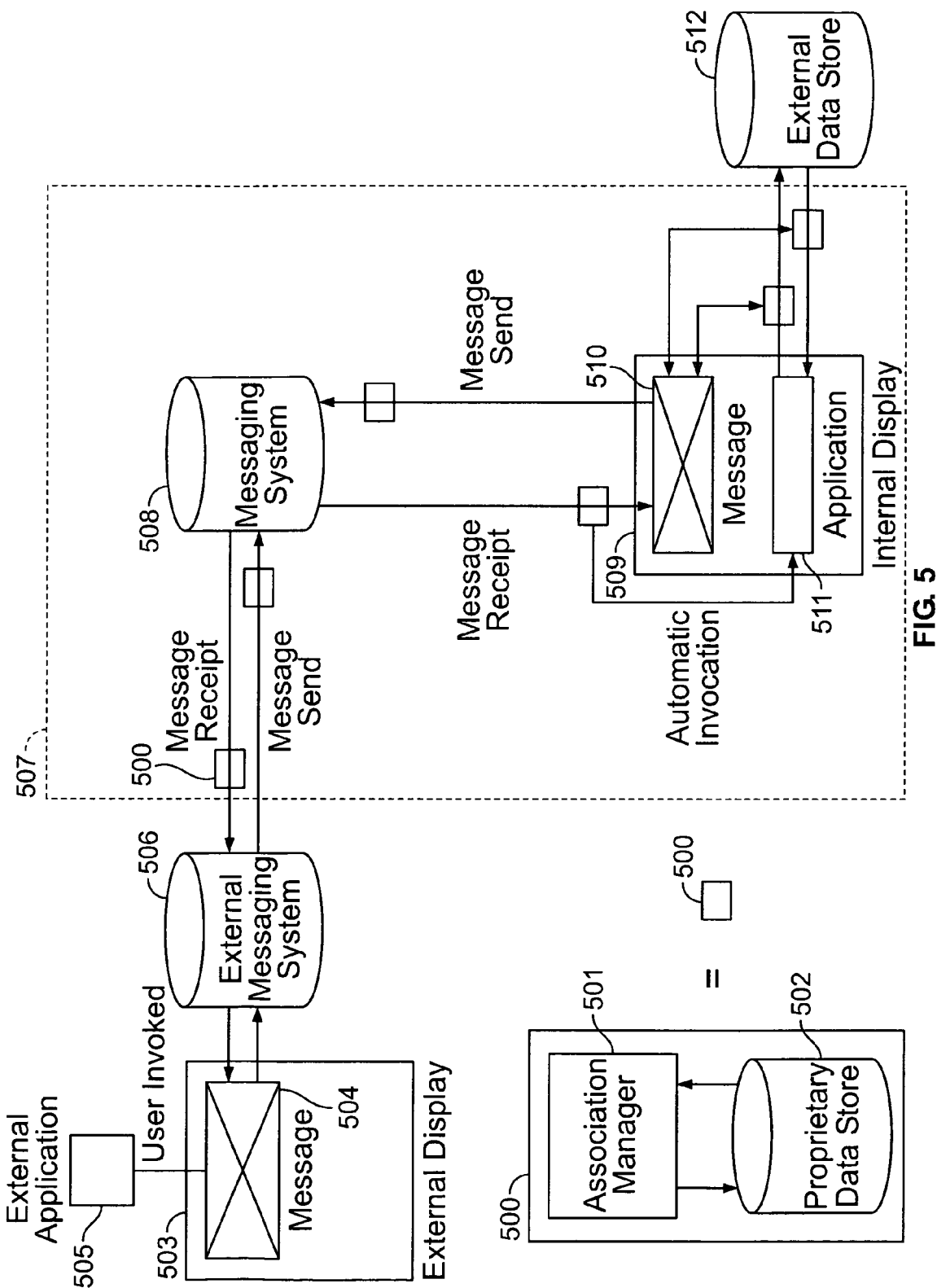
FIG. 5 is a block diagram of multiple system configurations in accordance with one or more embodiments of the invention.

FIG. 5 shows multiple configurations of the invention, as examples of the flexibility of arrangement of the Association Manger within any messaging context. The diagram displays a two-way point-to-point electronic communication of any type, with the Association Manager placed between any and all nodes of the message path to indicate the flexibility of the invention.

In FIG. 5, box 500 is presented in both an expanded and reduced view. For image clarity, only one of six depictions are labeled, with remaining unlabeled boxes within Contained Environment 507 also representing box 500. In the expanded view of Box 500, both Association Manager 501 and an optional Proprietary Data Store 502 are depicted.

External Display 503 contains Message 504 which may be either an incoming or outgoing message. If Message 504 is an incoming message, an embodiment of the invention may provide the user with the ability to invoke an External Application 505 directly from the message, by means of data appended to the message in some fashion.

In some embodiments of the invention, External Messaging System 506 may act as an intermediary node between External Display 503 and Contained Environment 507, where Contained Environment 507 is either a physical or logical separation of the invention from other systems not using the invention.

Box 500, representing Association Manager 501 and an optional Proprietary Data Store 502, may intercept either incoming or outgoing messages either prior to or after Messaging System 508 has received such messages. Box 500 associates message types, elements, and/or content either with data pre-cached in Proprietary Data Store 502 or in External Data Store 512. In one or more embodiments, Box 500 may also, or alternatively, associate message types, elements, and/or content with data stored in Messaging System 508.

When Messaging System 508 either sends or receives a Message 510 to or from Internal Display 509, Association Manger 501 (represented by unnumbered Box 500) may (or may not) intervene and inspect Message 510 for association data to compare with data either pre-cached in Proprietary Data Store 502, or contained in External Data Store 512.

In some embodiments of the invention, upon inspection of incoming Message 510, Association Manager 501 may check data in either Proprietary Data Store 502 (if present in a particular embodiment of the invention), or External Data Store 512. If association data returned so indicates, Association Manager 501 may automatically invoke Application 511 within Internal Display 509.

In one or more embodiments of the invention, Internal Display 509 represents an integrated application interface. Incoming and outgoing data changes passed between Application 511 and External Data Store 512 may be inspected by Association Manager 501. Depending on associations previously established between Message 510 and data elements in External Data Store 512, data may be appended to Message 510, or Message 510 may simply be invoked in the context of a need in Application 511.

Embodiments of the invention illustrated in FIG. 5 are examples of how one or more embodiments of the invention may be used with electronic messaging interactions, such as the following:
  Message receipt
  Message send
  Message store
  Message Display
  Association of Message to External Data Store
  Storing of association data in proprietary data store
  Updating of Application with activity history when message is received or sent
  User invocation of an application
  invocation of an application The above list is not exhaustive and represents electronic messaging interaction examples only. The invention should not be construed as being limited to the electronic messaging interactions listed.

Added Benefits of the Invention

Because data becomes associated with a message, one added effect of one or more embodiments of the invention is that data linking can be used in the opposite direction as well. For example, a user working in an application external to the messaging system may be able to click on an item (e.g., a lead) in an external application and invoke a particular e-mail associated with an event in the workflow of that application.

In addition, automated linking of multiple identities stored in disparate messaging formats also becomes possible. To return to the example of a person using a CRM program, suppose a lead has given a home phone number (listed under a spouse's name), an at work e-mail address, a personal e-mail address with a disguised identity, and has also used Instant Messaging (with a different disguised identity) to contact the user. Prior to this invention, searching for all communications from a lead named Bob Smith might take the CRM user some time, and the user might miss an important communication. Because of the association of CRM data to all communications from the lead, regardless of message format, embodiments of the invention make it possible to perform a quick search that results in the display of all of Bob's contacts with the user.

Embodiments of the invention also make possible the linking of data not only to the originator of an incoming message, but also to any other recipients. For example, a visual cue may be displayed next to a name in the "cc" list of an e-mail message. In like manner, content of a message may be parsed and a sensory cue may be presented to the user in connection with the names of individuals mentioned in the message body (e.g., visually presented next to the names of those individuals).

In addition, one or more embodiments of the invention may support the nesting of data associations. In other words, not only may the message type (e.g., an e-mail) be associated with a data element (e.g., a lead), the content of a "cc" field (a name) may be associated with another data element, while an attachment to the e-mail (a message element) may be associated with yet a third kind of data (e.g., authorship data), which may alert a user to the fact that the document is too old to be useful.

Thus, a method and apparatus for associating message types with data elements is described. Particular embodiments described herein are illustrative only and should not limit the present invention thereby. The invention is defined by the claims and their full scope of equivalents.

We claim:

1. In a computing environment comprising a messaging system and one or more data sources, an apparatus for associating messages with data comprising:
  an association manager capable of interfacing with an electronic mail messaging system and one or more data sources, said association manager configured to obtain an electronic mail message and to create an association between one or more elements of said electronic mail message with one or more elements of data from said data sources, said association manager further configured to analyze said electronic message to determine one or more external data sources from which said one or more elements of data are to be retrieved, wherein said one or more elements of data comprise workflow data associated with an order in which activities associated with a given task are completed, and wherein said association manager is configured to facilitate workflow management by providing a context for said one or more elements of said electronic mail message and said one or more elements of data; and
  a user interface enabling a user to create one or more sensory cues indicative of said association of one or more elements of said electronic mail message with said one or more elements of data from said data sources.

2. The apparatus of claim 1, wherein said sensory cues comprise one or more of: a type-based sensory cue associated with a given message type; an element-based sensory cue associated with a given message element; and a sender-based sensory cue associated with messages received from one or more specified senders.

3. The apparatus of claim 1, wherein said one or more data sources comprise a data store.

4. The apparatus of claim 1, wherein each of said data sources comprise a data context.

5. The apparatus of claim 1, wherein said association manager is configured to obtain one or more descriptives from said electronic mail message and identify said one or more data sources based on said one or more descriptives.

6. The apparatus of claim 1, wherein said association manager is configured to analyze one or more message type attributes and one or more message elements.

7. The apparatus of claim 1, wherein said association manager is configured to analyze metadata associated with said electronic mail message.

8. The apparatus of claim 7, wherein said metadata comprises at least one metadata element from the set comprising: an email header; a telephone destination number; a caller identification; information identifying said electronic mail message; and information identifying contents of said electronic mail message.

9. The apparatus of claim 1, wherein said association manager is configured to create an association between said one or more elements of said electronic mail message and said one or more elements of data programmatically.

10. The apparatus of claim 1, wherein said association manager is configured to create an association between said one or more elements of said electronic mail message and said one or more elements of data in response to a user action.

11. The apparatus of claim 1, wherein said association manager is configured to obtain one or more data values describing an association between said one or more elements of said electronic mail message and said one or more elements of data.

12. The apparatus of claim 11, wherein said association manager is configured to store said one or more data values with said electronic mail message.

13. The apparatus of claim 11 wherein said association manager is configured to associate a data package with said electronic mail message, wherein said data package comprises said data values.

14. The apparatus of claim 13, wherein said association manager is configured to associate said data package with said electronic mail message by attaching said data package to said electronic mail message.

15. The apparatus of claim 1, wherein said association manager is configured to link said one or more elements of data to an originator of said electronic mail message.

16. The apparatus of claim 15, wherein said originator of said electronic mail message is associated with a plurality of identities in one or more messaging systems, and wherein said association manager is configured to associate said plurality of identities with said one or more elements of data.

17. The apparatus of claim 1, wherein said association manager is configured to link said one or more elements of data to one or more recipients of said electronic mail message.

18. The apparatus of claim 1, wherein said association manager is configured to present said sensory cue at or before a time said user receives said electronic mail message.

19. The apparatus of claim 1, wherein said association manager is configured to provide a link between said sensory cue and a user interface element that enables said user to act upon said one or more elements of data associated with said one or more elements of said electronic mail message.

20. The apparatus of claim 19, wherein said user interface element is provided by an application external to said electronic mail messaging system of said electronic mail message.

21. The apparatus of claim 19, wherein said link enables said user to act upon said user interface element of said external application and invoke said electronic mail message in said electronic mail messaging system.

22. The apparatus of claim 1, wherein said association manager is configured to provide controlled access to said electronic mail message and said one or more elements of data based on one or more access rules.

23. The apparatus of claim 22, wherein said one or more access rules are based on one or more user-specific roles.

24. The apparatus of claim 1, wherein said association manager is configured to parse said electronic mail message and present a user with a sensory cue in connection with one or more names of individuals referenced within said electronic mail message.

25. The apparatus of claim 1, wherein said association manager is configured to nest a plurality of data associations wherein a plurality of levels of association with a plurality of types of said elements of data are established.

26. In a computer system, a method for associating electronic mail messages with data elements comprising:
   obtaining an electronic mail message via an electronic mail messaging system;
   creating an association between one or more elements of said electronic mail message to one or more elements of data in one or more data sources external to said electronic mail messaging system wherein creating the association between said one or more elements of said electronic mail message comprises analyzing said electronic mail message to determine one or more external data sources from which said one or more elements of data are to be retrieved, wherein said one or more elements of data comprise workflow data associated with an order in which activities associated with a given task are completed, and wherein said association manager is configured to facilitate workflow management by providing a context for said one or more elements of said electronic mail message and said one or more elements of data; and
   via a user interface, enabling a user to create one or more sensory cues indicative of said association of one or more elements of said electronic mail message with said one or more elements of data from said data sources.

27. The method of claim 26, wherein said one or more data sources comprise a data store.

28. The method of claim 26, wherein said one or more data sources comprise a data context.

29. The method of claim 26, wherein analyzing said electronic mail message comprises obtaining one or more descriptives and identifying said one or more data sources based on said one or more descriptives.

30. The method of claim 26, wherein analyzing said electronic mail message comprises analyzing one or more message type attributes and one or more message elements.

31. The method of claim 26, wherein analyzing said electronic mail message comprises analyzing metadata associated with said electronic mail message.

32. The method of claim 31, wherein said metadata comprises at least one metadata element from the set comprising: an email header; a telephone destination number; a caller identification; information identifying said electronic mail message; and information identifying contents of said electronic mail message.

33. The method of claim 26, wherein an association between said one or more elements of said electronic mail message and said one or more elements of data is created programmatically.

34. The method of claim 26, wherein an association between said one or more elements of said electronic mail message and said one or more elements of data is created in response to a user action.

35. The method of claim 26, wherein associating said one or more elements of said electronic mail message with said one or more elements of data further comprises obtaining one or more data values describing an association between said one or more elements of said electronic mail message and said one or more elements of said data.

36. The method of claim 35, further comprising storing said one or more data values with said electronic mail message.

37. The method of claim 35, further comprising associating a data package with said electronic mail message, wherein said data package comprises said data values.

38. The method of claim 37, wherein associating said data package with said electronic mail message comprises attaching said data package to said electronic mail message.

39. The method of claim 26, further comprising linking said one or more elements of data to an originator of said electronic mail message.

40. The method of claim 39, wherein said originator of said electronic mail message is associated with a plurality of identities in one or more messaging systems, said method further comprising associating said plurality of identities with said one or more elements of data.

41. The method of claim 26, further comprising linking said one or more elements of data to one or more recipients of said electronic mail message.

42. The method of claim 26, wherein a sensory cue indicative of said association of one or more elements of said electronic mail message with said one or more elements of data from said one or more data sources is presented at or before a time said user receives said electronic mail message.

43. The method of claim 42, further comprising: providing a link between said sensory cue and a user interface element that enables said user to act upon said one or more elements of data associated with said one or more elements of said electronic mail message.

44. The method of claim 43, wherein said user interface element is provided by an application external to said electronic mail messaging system.

45. The method of claim 43, wherein said link enables said user to act upon said user interface element of said external application and invoke said electronic mail message in said electronic mail messaging system.

46. The method of claim 26, further comprising providing controlled access to said electronic mail message and said one or more elements of data based on one or more access rules.

47. The method of claim 46, wherein said one or more access rules are based on one or more of user-specific roles.

48. The method of claim 26, further comprising parsing said electronic mail message and presenting a user with a sensory cue in connection with one or more names of individuals referenced within said electronic mail message.

49. The method of claim 26, further comprising: nesting a plurality of data associations wherein a plurality of levels of association with a plurality of types of said elements of data are established.

50. The method of claim 26, wherein enabling said user to create said one or more sensory cues comprises: enabling said user to create a type-based sensory cue associated with a given message type; enabling said user to create an element-based sensory cue associated with a given message element; and enabling said user to create a sender-based sensory cue associated with one or more prior electronic mail messages received from one or more specified senders.

* * * * *